July 10, 1923.

J. B. McMULLEN 1,461,398

WINDSHIELD VISOR

Filed Feb. 7, 1921

Witnesses

Inventor:
JOSEPH B. McMULLEN his Attorney:

Patented July 10, 1923.

1,461,398

UNITED STATES PATENT OFFICE.

JOSEPH B. McMULLEN, OF CATONSVILLE, MARYLAND, ASSIGNOR TO ACME MOTOR SHIELD CORPORATION, OF BALTIMORE, MARYLAND, A CORPORATION OF DELAWARE.

WINDSHIELD VISOR.

Application filed February 7, 1921. Serial No. 442,906.

*To all whom it may concern:*

Be it known that I, JOSEPH B. McMULLEN, a citizen of the United States, residing in the town of Catonsville, county of Baltimore, State of Maryland, have invented certain new and useful Improvements in Windshield Visors, of which the following is a specification, reference being had to the accompanying drawings, illustrative of one particular embodiment of my invention.

This invention relates to windshields and screens therefor sometimes called visors, serving to afford a protection for a driver or occupant in a vehicle or under similar conditions, from the glare on the windshield, and also from the clouding of the windshield by moisture, rain or snow. Generally, the invention serves to insure under adverse conditions a clear view ahead through a windshield, or to a driver in guiding a fast moving unit such as a vehicle, boat, etc.

In particular, my invention hereinafter set forth is intended to provide for the attachment of a visor with peculiar advantages, and to insure the support under varying conditions not possible with constructions heretofore used, and likewise to permit the attachment of a complete visor fitment of uniform size to bodies or windshield parts of different sizes in different cars or boats, etc. I, furthermore, provide a visor which may be extended laterally further than the windshield, so as to afford complete protection by shielding against side rays as well as rays directly from the front, which would otherwise glare and blind the vision of the driver, or would interfere with any one's view ahead.

In one particular embodiment of my invention, of which the following is a full specification, reference is made to the accompanying drawings in which.

In the particular embodiment my visor is shown attached to the front of on automobile, which has a windshield and side stanchions which at their top are secured to the forward end of a canopy top, forming a very usual automobile construction, and which will illustrate some of the advantages of my invention. Without any modification of the standard features, my visor of standard length as a complete fitment, is secured without change of top, windshield or stanchions, and may be fixed to the exact position desired for the elevation of the roller or visor screen, housed and the exact inclination of the visor when extended.

This is accomplished by supporting the visor A with its roller B by the roller bracket C with the intermediate bracket plate D adjustable and held by the interengaging serrations $d$, while the bracket D carries the distance rod E and the duck-bill or notch F on either side of the intermediately pivoted hub $G'$ of the extension rod G on either side of the visor, which has the notch $g$ at its extremity adapted to be engaged by the hook $h$ on the visor edge rod H when extended. The visor rod extremity $h$ likewise engages and holds against lateral movement in the duck-bill F, when the visor screen is furled or collapsed, thereby holding the screen clear of the extension arms which are swung inwardly and engage lock-stops $e$—$e$ on the torsion and distance rod E.

The roller or main bracket C is pivoted on an adjustable arm J bent at the other end to a tapered boss $J'$ merging into a threaded end $J''$, accommodating a nut $j$ which serves to divide the clamping strain on the plate K to draw it to plate $K'$ which has the tapered hole to accommodate the tapered boss $J'$ of the adjustable arm, and likewise has a suitably formed recess $k'$ cooperating with recess $k$, in plate K to engage the stanchion L, while the adjustable or distance screw $k''$ serves to provide proper alignment of the clamping plates K—$K'$ to insure the proper fit for most effective holding and strength of parts when secured. When secured to the stanchion or other suitable member, the visor screen roll B is supported at either end by complementary brackets C and D, and has its extended operative position determined by the slant or angle of the extension rod G at either end locked in position by the wing-nuts B'—B'. The plate C hinged to the arm J is the preferred construction but any equivalent thereof may be utilized, the essential matter being that the arm J be so attached to the visor that the angle of the arm with the length of the visor may be adjusted, or in other words, that the arms J at the two ends of the visor may be angularly adjusted relative to the visor in a common plane to vary the distance between the clamps, to fit windshield stanchions of varying spacings.

Figure 1:
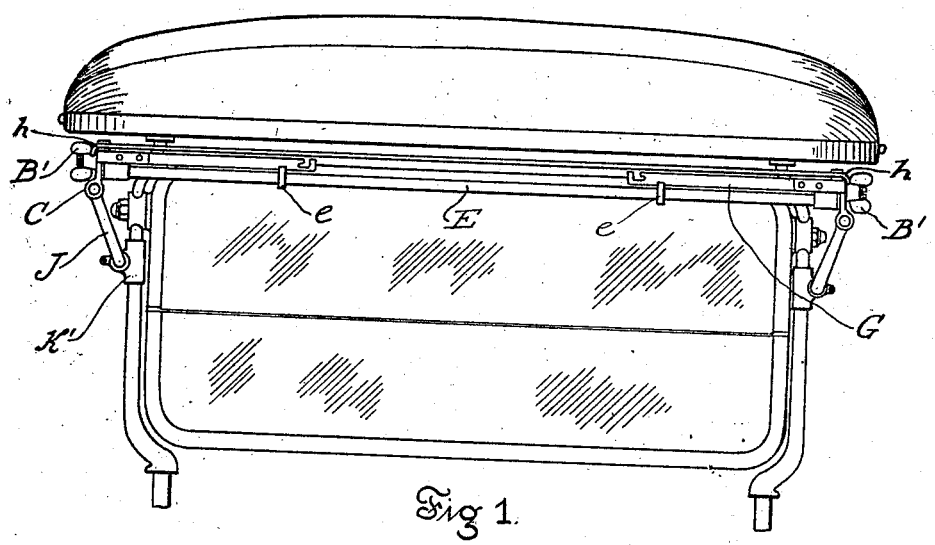
Fig. 1 is a front view of the visor furled or collapsed as supported in relation to a windshield.
Figures 2, 3, 4:
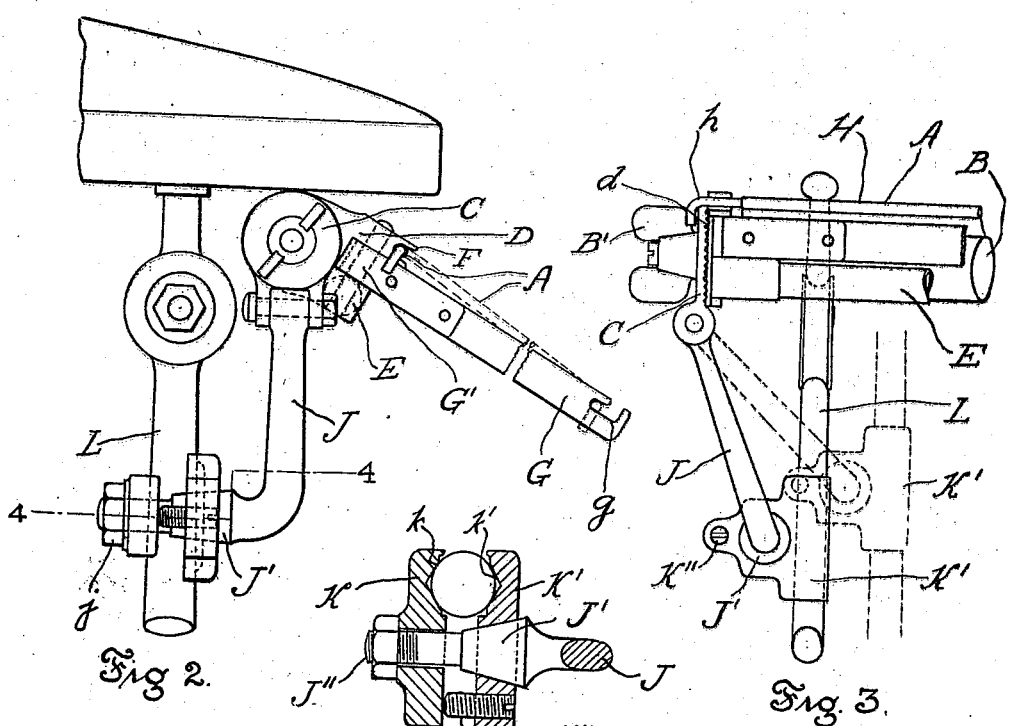
Fig. 2 is a side elevation of the visor with its supporting members attached to a windshield stanchion, shown fragmentary with the auto top.
Fig. 3 is a fragmentary front elevation of one end of the visor with its adjustable supporting members in shifted position shown in dotted lines to illustrate adaptability.
Fig. 4 is a section of the securing clamp on line 4—4, Fig. 2.

It will thus be seen that the clamp plates K—K' may be adjusted to any size or form of bars, stanchions or rods and securely locked, while the construction and form of arms J—J permit the application to varying dimensions of structure within practical limits, so that a uniform size of screen or visor fitment may be adjusted to and securely supported on a variety of supporting members, both as to form and relative distance of separation or height. Furthermore, as emphasized in Figs. 1 and 3, the visor fitment may be made of such length as to extend laterally beyond the windshield so as to cut off side light coming from above, in order to prevent its reflecting upon the glass of the windshield, and likewise more effectually prevent rain or snow flowing in from the side to blur the windshield glass.

In addition to the advantages heretofore set forth, all of the parts for support of the visor are so constructed and interconnected that they will not interfere with the forward vision in any way more than the stanchions or existing parts do before the addition of the visor fitment.

By this universal supporting arrangement of visor with all the necessary or desirable adjustments of this windshield adjunct, substantially standard size or sizes of visors may be attached without difficulty and in a most simple manner without marring, or any machinery or carpentry work, and likewise may be removed or replaced without the slightest injury to existing parts of the structure.

The form of bracket disclosed herein and claimed in combination with the visor is capable of independent use in supporting other devices, wherever the range of adjustments provided by the bracket are desirable, as for instance the supporting of a spotlight upon a windshield stanchion. The claims which recite the structure of bracket per se are therefore to be read accordingly.

While my invention may be variously embodied with changes of dimensions, material or relative arrangement, I do not confine myself to the particular structure herein more specifically described,—but what I claim and desire to secure by Letters Patent is:

1. In combination, a windshield visor, bracket arms, means for attaching said arms to said visor for angular adjustment relative to the length thereof, attaching fittings adapted to be secured to the supports at each end of a winshield each fitting having an opening, means passing through said openings to secure said arms to said fittings in their angularly adjusted positions whereby to support said visor upon windshields of varying dimensions.

2. In combination, a windshield visor, bracket arms, means for attaching said arms to said visor for angular adjustment relative to the length thereof, means permitting the visor to be rotated on the attaching means, attaching fittings adapted to be secured to the supports at each end of a windshield each fitting having an opening, means passing through said openings to secure said arms to said fittings in their angularly adjusted positions whereby to support said visor upon windshields of varying dimensions.

3. In combination, a windshield visor, bracket arms adjustably secured to said visor for angular adjustment with relation thereto in a common plane, clamps carried by said arms for attachment to stanchions, means whereby said clamps may remain in planes parallel with each other, when said arms are adjusted with relation to said visor.

4. In combination, a windshield visor, arms adjustably attached to said visor for angular adjustment with relation thereto in a common plane, clamps pivotally mounted on said arms for attachment to windshield supports whereby the distance between said clamps may be varied by said angular adjustment and said clamps may be adjusted to the supports by the pivotal mounting.

5. In combination, a wind shield visor, supporting elements to which said visor is secured, supporting arms pivotally attached to said elements for angular adjustment relative to said visor in a common plane, clamps upon which said arms are pivotally mounted whereby said visor may be mounted upon supports of varying spacing.

6. In combination, a windshield visor, supporting elements to which said visor is secured, supporting arms pivotally attached to said elements for angular adjustment relative to said visor in a common plane, clamps upon which said arms are pivotally mounted and means for simultaneously locking each arm to its clamp and securing its clamp to a support, whereby said visor may be mounted upon supports of varying spacing.

7. In combination, a windshield visor, supporting means therefor comprising supporting elements, means for securing the visor to the elements whereby the visor may be adjusted about its axis, arms pivotally secured to said elements, clamps pivotally secured to said arms whereby said arms may be adjusted in a common plane and said clamps may be attached to windshield stanchions of varying spacings.

8. In combination, a windshield visor, supporting elements secured to said visor, arms pivoted to said elements for angular adjustment relative to the longitudinal axis of the visor, clamps pivoted to said arms upon an axis substantially parallel with said first named pivots whereby said clamps may be attached to windshield stanchions of varying spacings.

9. In combination, a windshield visor, supporting elements secured to said visor, arms pivoted to said elements for angular adjustment relative to the longitudinal axis of the visor, clamps pivoted to said arms upon an axis substantially parallel with said first named pivots whereby said clamps may be attached to windshield stanchions of varying spacings, means for simultaneously locking each arm to its clamp and securing the clamp to the stanchion.

10. A bracket comprising, in combination, an arm, a member pivotally attached to one end of said arm and movable about an axis transverse to the length of said arm, a bent portion at the other end of said arm, clamps associated with said bent portion, and means for simultaneously locking said bent portion to said clamps and said clamps upon a support.

11. A bracket comprising, in combination, clamps for attaching said bracket to a fixed support, an arm having one end pivotally adjustable in said clamps and forming a clamping bolt, a member pivoted on the other end of said arm parallel with said bolt for attachment of a device to be supported.

12. In combination, a visor, a pair of brackets forming the sole support thereof, each bracket comprising an arm, means for attaching the arm to the visor for angular adjustment relative to the length thereof and means for attaching the arm to a wind shield support when angularly adjusted whereby the visor may be secured upon windshield supports of varying spacings.

13. A windshield visor and supporting means therefor comprising, in combination, a visor, supporting arms attached to the ends of said visor in fixed relation to the length thereof, clamping means adapted to be secured upon the supports of a windshield and supporting each arm, the means for attaching the visor to the arms and the mounting of the arms upon the clamping means being such that the latter may be secured upon windshield supports of varying spacing.

In testimony whereof, I have signed my name to this application, in the presence of two subscribing witnesses, this 10th day of February, 1921.

JOSEPH B. McMULLEN.

Witnesses:
MARCUS T. BOONE,
HERMANN F. CUNTZ.